Patented May 6, 1930

1,757,715

UNITED STATES PATENT OFFICE

ERNST HUELBRINK, OF BERLIN, AND MAX LUDWIG, OF PADERBORN, GERMANY, ASSIGNORS TO THE FIRM MARTINI & HÜNEKE MASCHINENBAU-AKTIENGESELLSCHAFT, OF BERLIN, GERMANY

HYDRAULIC FUEL-DISPENSING SYSTEM

Application filed December 1, 1928, Serial No. 323,053, and in Germany December 1, 1927.

Our invention relates to fuel-tapping plants in which the fuel is expelled from an underground storage tank by hydraulic means.

In such installations there are known methods of automatically shutting off the hydraulic main, when the tapping cock is closed, by means of a controlling device inserted in the hydraulic main, and at the same time putting the hydraulic main leading to the storage tank into communication with the atmosphere. For this purpose in the known devices, the tapping cock is directly coupled to the controlling device.

According to our present invention the dependence of the controlling device upon the tapping cock is attained by a special construction of the former, which renders a direct positive connection with the tapping cock unnecessary, so that the removal of the tapping point from the controlling device to be lodged in the immediate neighbourhood of the entrance of the hydraulic main into the storage tank makes no material difference.

Further improvements relate to the special embodiment of the inventive idea hereinbefore defined in general and also to the combination of the said inventive idea with a system for safeguarding the plant against fire.

Several preferred constructional forms of the present invention are illustrated by way of examples in the accompanying drawings in which

Figure 2 is a similar view of the controlling apparatus by itself, in a different operative position, while

By A is denoted the underground storage tank, to the upper portion of which is connected an ascending pipe $a$ leading to a tapping cock B. Into the ascending pipe $a$ there opens a pipe $b$ serving for filling the storage tank with petrol. Into the tank A is furthermore introduced a pipe $c$ for supplying water under pressure, and between the latter and a pressure-water feed pipe $d$ is introduced the automatic controlling apparatus denoted as a whole by C.

Figure 1:
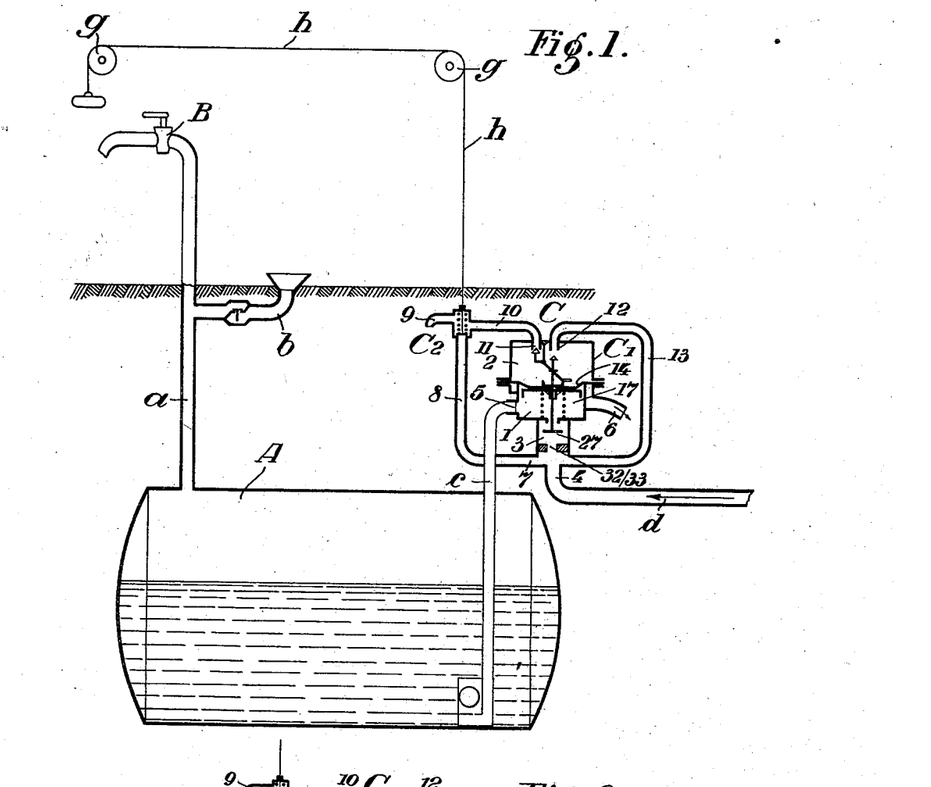
Figure 1 is a diagrammatic general view of an installation equipped with an improved controlling apparatus.
Figure 2:
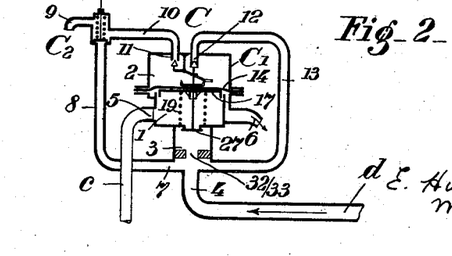
Figure 3:
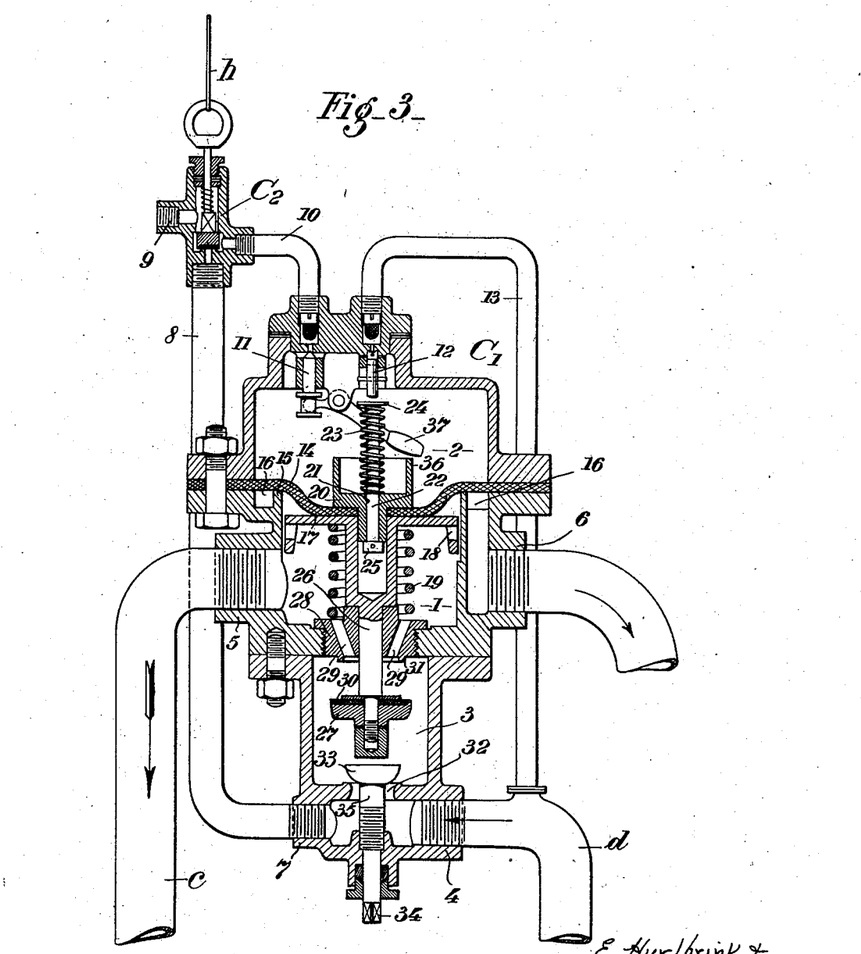
Figure 3 shows in sectional elevation on a larger scale the detailed construction of the controlling apparatus.

The controlling apparatus C shown in Figs. 1–3 consists of two main parts, namely the actual automatically operating controlling device $C_1$ and a control valve $C_2$ co-operating therewith, to be actuated by hand. The operating of this valve is preferably effected by means of a cable $h$, passing over rollers $g$ into the neighbourhood of the tapping cock B.

The controlling appliance $C_1$ forms a casing comprising three main chambers 1, 2 and 3 with a pipe union member 5 for the pressure-water pipe $c$ leading to the storage tank, a pipe union member 6 for the water discharge and a pipe union member 7 for a pipe 8 permanently connecting the feed pipe $d$ with the valve $C_2$. From the valve $C_2$ a pipe 9 leads to the atmosphere, and another pipe 10 to an automatically controlled inlet valve 11 opening into the chamber 2. Beside the latter is mounted a second automatically controlled pressure-water inlet valve 12, the connecting pipe 13 of which is in permanent communication with the feed pipe or hydraulic main $d$.

In the interior of the casing, containing the chambers 1, 2 and 3, is provided a diaphragm 14 which bears at times upon an upwardly projecting rim 15. A nozzle or pipe union member 6 puts an annular chamber 16, formed by the said rim 15 and the wall of the casing 1, into communication with the atmosphere. The diaphragm is connected by a screw 20 with a piston 17, which has apertures 18 and co-operates with a spring 19, which presses it inwards. The screw 20 connecting the diaphragm with the piston is provided with a bore 21, in which is supported a displaceable spindle 22, which is subject to the influence of a spring 23, and carries at its upper end a collar 24 and at its lower end a collar 25.

According to Fig. 3 the spring 23 holds the spindle 22 with its collar 25 in contact with the lower facing of the screw 20.

The piston 17 is connected by a spindle 26 with another valve cone 27, which is pushed upwards by the piston, thereby closing passage apertures 29 in an intermediate bottom 28 by pressing a packing disc 30 against a packing rim 31. In the lower casing chamber 3 is provided, above a passage aperture 32 forming a medium of communication with the feed water supply pipe $d$, another valve cone 33, which is vertically adjustable, and which, by the rotation of its rectangular extremity 34, enables its spindle 35 to adjust as required the cross-sectional area of the passage for the water under pressure passing out of the pressure water pipe $d$ and the nozzle or pipe union 4 into the chamber 3.

In the position of rest, shown in Figure 2, the piston 17 is pushed upward under the action of the spring 19 so far that its marginal apertures 18 protrude beyond the rim 15, and at the same time the valve cone 27 closes the packing rim 31. Furthermore in the position of rest the spindle 22, with its collar 24, is pressed by the spring 23 against the water inlet valve 12, so that the latter cannot admit any water. Consequently, the pressure water pipe $c$ leading to the storage tank and connected with the pipe union 5 communicates through the holes 18 with the water discharge nozzle 6. It is therefore without pressure. The pressure water, which tends to penetrate out of the pipe $d$ through the nozzle, 4, remains inoperative, since the valve cone 27 closes the passage apertures 29, and because also the control valve $C_2$ is still closed. The water inlet valve 11 in the upper part of the controlling appliance is however opened, since an upwardly projecting rim 36 of the diaphragm screw 20 has raised the weight lever 37 effecting the opening of the valve 11, as shown in Figure 2.

Now when tapping is to take place it is only necessary, after opening the tapping cock B, for the control valve $C_2$ to be raised a short time so that water under pressure from the pipe $d$ can enter the upper casing chamber 2 through the pipe union 7, the pipe 8, the control valve $C_2$ and the valve 11. The water under the diaphragm 14 can now be displaced with compression of the spring 19 without appreciable resistance, partly from the nozzle 5 into the storage tank, and partly through the water discharge nozzle 6 into the open.

Even during the first part of the downward movement of the piston 17 its apertures 18 are covered by the rim 15 and at the same time the valve cone 27 is opened, which now admits water under pressure through the apertures 29 into the chamber 1. The water passes through the pipe $d$ into the storage tank, a fall of pressure occuring however at the throttling point 32, 33, the magnitude of the fall of pressure being varied by adjusting the valve cone 33. By the fall of pressure the quantity of pressure water is determined, and therefore the quantity of work to be done in delivery, so that the latter admits of being regulated by adjusting the valve cone 33.

By the pressure water flowing in out of the opened control valve $C_2$ the spring 19 is compressed, with deflection of the diaphragm 14, until the piston bears with a projection on its spindle 26 against the bottom 28, whereby the normal tapping position is obtained, as shown in Figure 1.

Meanwhile by contact of the collar 25 with the threaded shank of the screw 20, the spindle 22, with the collar 24, is drawn so far downwards that the water inlet valve is now released, and therefore the supply of pressure water from the pipe $d$ through 13 to the chamber 2 is also maintained, when the control valve $C_2$ is released again and closes, its connecting pipe 10 being in communication with the water discharge nozzle 9. Nevertheless the pressure water does not pass out of the chamber 2 through the valve 11 because this valve has meanwhile been closed by the weight lever 37, which has been released from the rim 36 of the screw 20. Hence the pressure water passes through the pipe $d$, the throttling point 32, 33, the bores 29, and the pipe $c$ into the storage tank, and displaces the petrol contained therein as long as the tapping cock B is held open.

When the tapping cock B is closed, the fall of pressure at the throttling point 32, 33 will disappear in consequence of the cessation of the flow, and the pressure prevailing in the hydraulic pipe $d$ will also recur in its full magnitude in the chamber 1. This pressure, in conjunction with the pressure of the spring 19 acting in the same direction, now acquires predominance over the specifically equal pressure in the upper chamber 2, and displaces the diaphragm back again in an upward direction, the valve 12 being first closed again and the valve 11 being opened again by the raising of the weight lever 37. Consequently a relaxation of pressure now occurs in the chamber 2, since the water can escape therefrom through the valve 11 and the control valve $C_2$ into the water discharge nozzle 9.

The consequence of this is that the spring 19 drives the piston 17 still higher, until at least the bores 18 are raised above the rim 15, whereby the hydraulic supply pipe $c$ of the storage tank is brought into communication with the water discharge connection 6, which results in a complete relaxation of pressure.

At every fresh tapping, the series of operations described is repeated in the same manner.

It should be observed that any water leaking through when the valve cone 27 is closed, owing to the latter not being water-tight, passes to the discharge connection without having any effect, while any leakage occurring owing to the automatically closing valve 12 not being water-tight, passes through the control valve $C_2$ into the open. In both cases the leakage water remains without effect.

Figure 4:
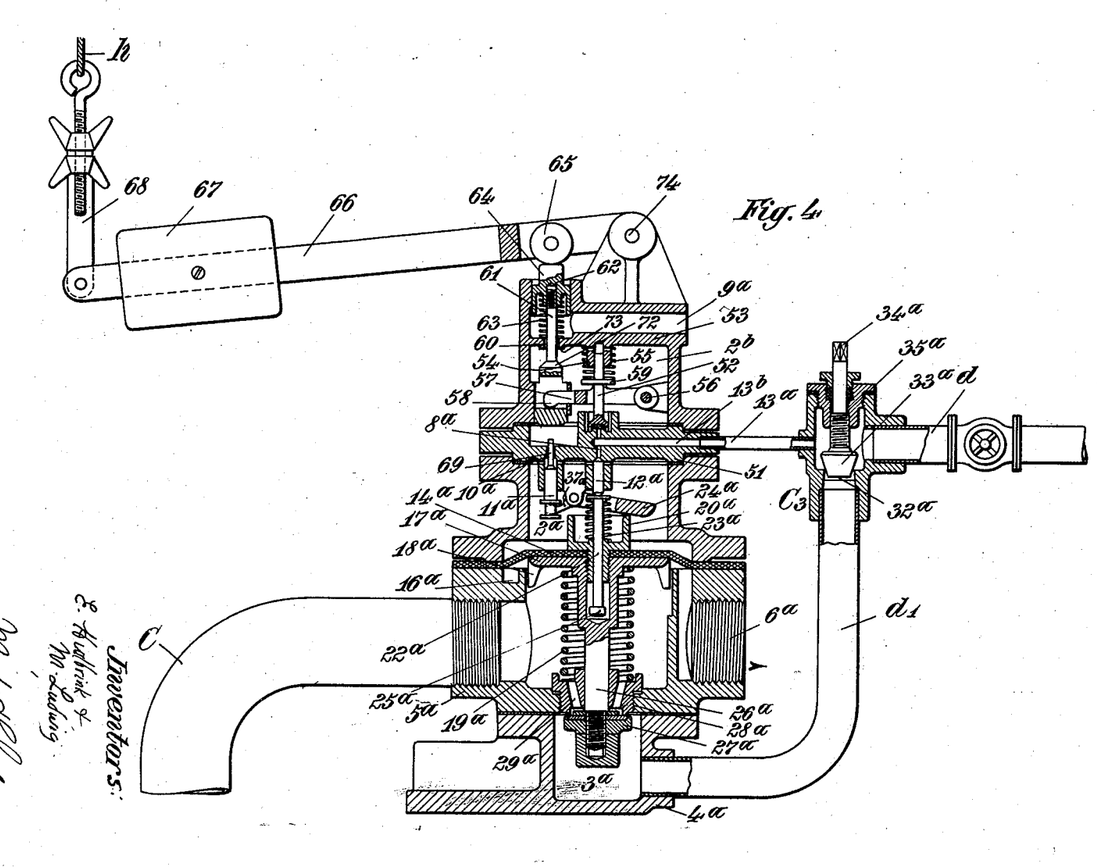
Figures 4 to 6 are enlarged vertical sections of a modification of the controlling apparatus, the said sections showing the several parts of the apparatus in three different operative positions.
Figure 5:
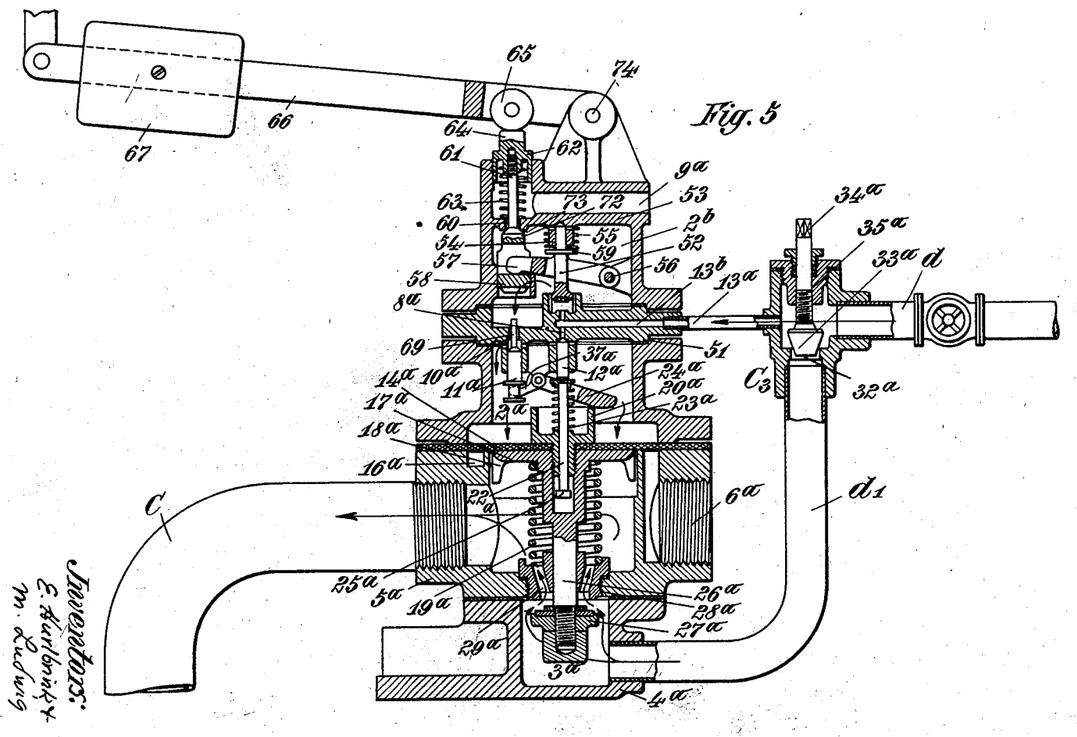
Figure 6:
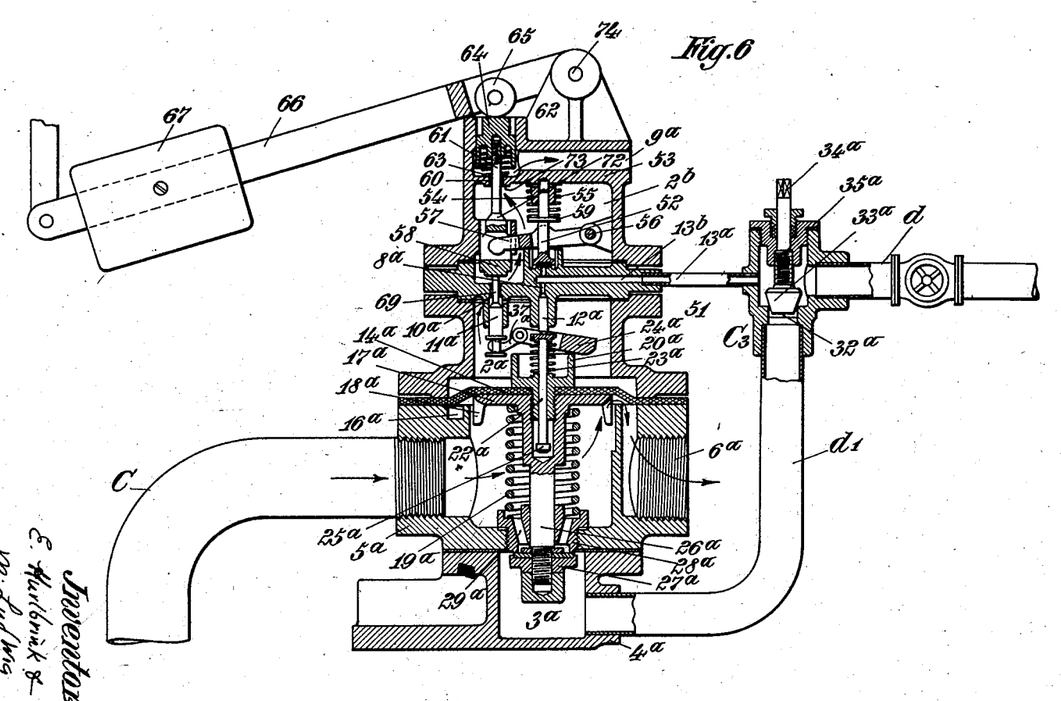

The controlling apparatus according to Figs. 4 to 6 differs from the apparatus described above substantially in the following features:

The throttling point with the controlling valve is not inclosed in the casing of the controlling apparatus $C_1$ but placed in a special valve casing $C_3$ which is provided in a pipe $d_1$ communicating with the pipe union member 4 of the lower part of the casing (Figs. 4 to 6). From the valve casing $C_3$ the pipe $13^a$ corresponding with the pipe 13 according to Fig. 3 leads to the additional inlet valve $12^a$ which is provided in a wall 51 of the casing of the apparatus. A fourth chamber $2^b$ is adjacent to said wall. The valve $12^a$ is governed by a spindle $22^a$ which is guided in the bore of a screw $20^a$ connecting the diaphragm $14^a$ with the piston $17^a$ and which is influenced by the pressure of the spring $24^a$.

In the wall 51 also the inlet and outlet valve $11^a$ is provided from which an actuating pin 69 extends upwardly through the valve opening $10^a$ into the chamber $2^b$. The said valve controls the communication between the chambers $2^a$ and $2^b$.

A branch duct $8^a$ provided in the wall 51 also communicates with the chamber $2^a$. The said duct proceeds from a bore $13^b$ of the wall 51, the said bore forming an extension of the duct $13^a$. With the said bore also the branch duct communicates which is controlled by the valve $12^a$.

52 is a valve which corresponds with the controlling valve $C_2$ of the apparatus described before. The spindle or stem of the said valve 52 is guided in a projection 54 of the upper wall 53 of the casing, and the said valve is pressed upon its seat by a spring 55. The valve 52 is actuated through the intermediary of a lever 57 which is mounted at 56 in the chamber $2^b$. The said lever is adjacent to a collar 59 of the valve spindle and may be moved upwardly against the tension of the spring 55, whereby the valve 52 is opened to connect the pipe $d$ for the pressure-water with the chamber $2^b$ through the intermediary of the ducts $13^a$, $13^b$, $8^a$.

The driver 58 forms the guide of the water-outlet valve 72 the seat 73 of which is provided on the wall 53. The spindle 61 of the valve 72 forms an annular gap 60 with the valve opening in the wall 53. On its upper end the spindle 61 is guided with a head-piece 62 in a projection of the casing. A spring 63 tends to move the valve 72 into its closed position. When the valve 72 is open, the gap 60 connects the chamber $2^b$ with a channel $9^a$ of upper wall of the casing. The said channel $9^a$ corresponds with the discharge-nozzle 9 of the apparatus described above and discharges into the free atmosphere.

In contact with an extension 64 of the guide 62 is a roller 65 which is fixed on a lever 66 mounted at 74 on the casing of the apparatus. On this lever a threaded piece 67 is adjustably fixed which normally presses the spindle 61 and the driver 57 downwardly to keep the valve 72 open. A cable $h$ acts on the free end of the lever 76 through the intermediary of an adjustable pulling member.

The inlet and outlet valve $11^a$ is controlled by the weighed lever 66 or the driver 58 through the intermediary of the pin 69. The additional inlet valve $12^a$ is controlled by the displaceable pin $22^a$ which is influenced by the spring $23^a$. The inlet valve 52 is controlled on the one hand by the spring 55, on the other hand by the driver 58 through the intermediary of the lever 57. The said driver and also the outlet valve 72 is influenced by the strong spring 63.

The operation of the apparatus described above is the following:

In the position of rest, shown in Fig. 4, the main valve $27^a$ is closed and the piston $17^a$ in connection with the diaphragm $14^a$ is lifted to such an extent that the water pipe $c$ leading to the storage tank is in connection with the discharge nozzle $5^a$. In consequence thereof the water levels on the overflow-rim are equalized, whilst the gasoline correspondingly recedes from the pipe $a$. The inlet and outlet valve $11^a$ and also the outlet valve 72 is opened, whilst the inlet valve 52 and the additional inlet valve $12^a$ are closed. The weighed lever 66 is in the position shown in Fig. 4 in which the handle 43 on the other end of the cable $h$ (Fig. 7) is forcibly held in contact with the stop 44 by the weight 67.

The tapping operation is initiated after the opening of the gasoline tapping cock according to Fig. 5 by lifting the weighed lever 66 by means of the cable $h$, whereby under the influence of the spring 63 the outlet valve 72 is closed and the inlet valve 52 is opened. In consequence thereof the water forcibly enters into the upper diaphragm-chamber through the water inlet and outlet valve $11^a$ and moves the diaphragm $14^a$ downwardly whereby the pipe $c$ is shut off from the nozzle $6^a$ and the pressure-water valve $27^a$ is simultaneously opened. In consequence thereof a quantity of water in correspondence with the throttling conditions at $32^a$ flows from the water duct $d$ into the storage tank and expels the gasoline.

The tapping operation being initiated it is no more necessary to exert a pull on the cable $h$, and the lever 66 may drop into its medium position (Fig. 4) without effecting an interruption of the tapping operation, as the additional inlet valve $12^a$ is now open and the inlet and outlet valve is closed under the influence of the weighed lever $37^a$, so that the pressure in the upper diaphragma chamber is maintained.

The tapping operation is finished by closing the tapping cock and simultaneously a complete release of the pressure in the storage tank and a shutting off of the pressure-water duct takes place, as is illustrated in Fig. 4 for the position of rest, as the temporary increase of the pressure in the storage tank due to the closing of the tapping cock works in the direction of the pressure of the spring $19^a$ and lifts the diaphragma $14^a$ whereby the duct $c$ is connected with the nozzle discharge $6^a$ through the intermediary of the annular duct $16^a$, whilst the pressure-water duct $d$ shut off by means of the valve $27^a$. Simultaneously the threaded ring $20^a$ above the diaphragma $14^a$ effects an opening of the inlet and outlet valve $11^a$ through the intermediary of the lever $37^a$ and in consequence thereof a discharge of the water from the upper diaphragm-chamber $2^a$ to the water outlet valve 72 and into the discharge duct $9^a$. In the state of rest a dispense of gasoline in the case of breakage or leaking of the gasoline ascending duct is therefore impossible.

Figure 7:
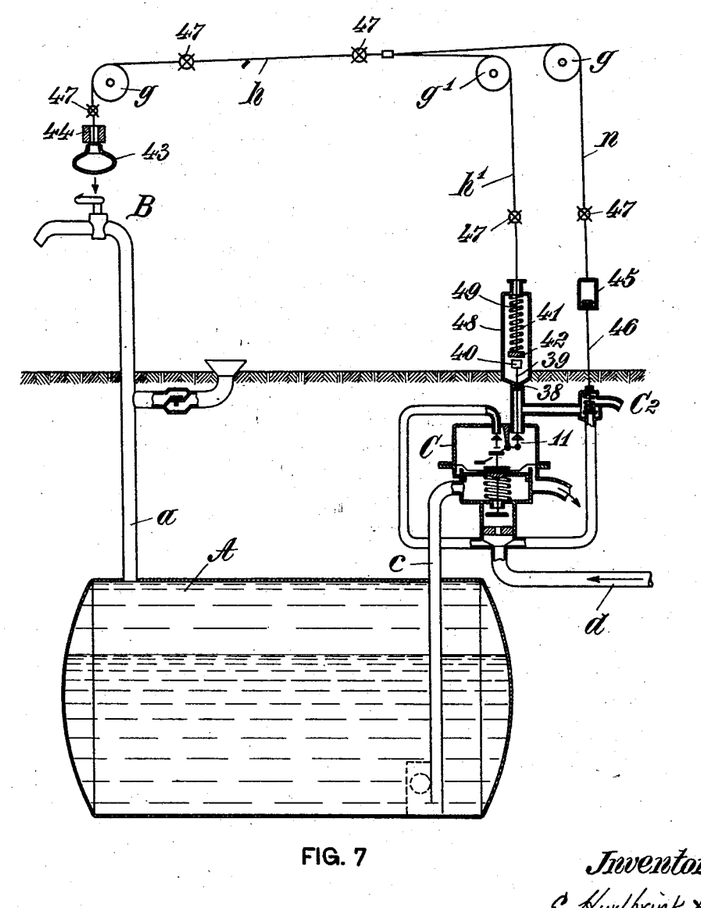
Figure 7 is a diagrammatic general view of the installation including means for safeguarding against fire.

The installation according to Fig. 7 corresponds in respect of the total arrangement and also in respect of the execution and operation of the controlling device substantially with the installation according to Figs. 1 to 3. The modifications relate to the safeguarding of the installation against fire and are as follows:

From the cable $h$ connecting the handle 43 with the controlling valve $C_2$ a second cable $h_1$ is branched off which is guided over a roller $g_1$. The cable $h_1$ is connected with a rod 49 and kept in tension by a spring exerting pressure against a cross-piece 42 of the said rod. The said spring is lodged in an extension 48 of the casing. At the tapping spot a collar of the handle 43 is thereby in contact with a stop formed by the guide 44. In a certain distance below the cross-piece 42 the head 40 of a spindle 39 is located going through a stuffing-box 38 and being connected with the inlet and outlet valve 11 of the controlling apparatus C.

The cable $h$ for operating the valve $C_2$ is connected with an upper elongation of the spindle 46 of the valve $C_2$ through the intermediary of a bent piece 45. The said spindle is guided through an aperture of the transverse portion of the piece 45 and is provided at its upper end with a collar through which motion is imparted to it, when pull is exerted on the cable $h$.

In both of said cables $h$ and $h_1$ fusible safeguarding sections 47 are intercalated at several points which come to effect as soon as the temperature at the respective points is increased to a certain amount f. i. in consequence of a conflagration, so that after the smelting of the said intermediate sections 47 the several portions of the cables are no more in connection with each other, so that no pulling forces can be applied to the cables. The fusible safeguarding means may be of any suitable known construction.

The operation of the installation according to Fig. 7 is the following:

As long as the fusible means are in a solid state the normal operating is as follows:

In the case of a tapping first the tapping cock at B and then the valve $C_2$ is opened, the opening of the latter being executed by applying a pulling force to the handle 43 and the cable $h$. Thereby pressure-water enters into the controlling apparatus C to bring the elements of the said apparatus into the working positions. By the pulling force exerted on the handle 43 also the cross-piece 42 is lifted against the action of the spring 41. After the initiating of the expensing operation it is no more necessary further to exert the pulling force on the handle 43, so that under the pressure of the spring 41 the cross-piece 42 may return into the position which is illustrated in the drawing. The same occurs with the valve $C_2$ under the influence of its own spring.

In the case of a conflagration the safeguarding means 47 or some of them will smelt. In consequence thereof the cross-piece 42 is moved by the spring 41. The said cross-piece imparts motion to the head 40 of the spindle 39 whereby the valve 11 is opened. The discharge of water from the controlling apparatus C is now effected and the apparatus is automatically released from pressure so that every possibility of expensing gasoline from the tap B is outdone. Simultaneously the entering of pressure-water through the valve $C_2$ is obviated, as the said valve can no more be opened by pulling on the handle 43.

In the installation described above not only the cables provided with fusible safeguarding means are of importance but also the fact that the controlling means containing the safeguarding means are normally employed in the installation so that the whole plant is permanently watched over for its regular operation and its reliability in the case of danger is warranted.

When using safe-guarding means which are not also employed for the regular operation of installation, there is the danger that such safeguarding means are subjected to alterations for not having been used during a long time, and that the said safeguarding means do not work in the case of danger on account of the said alterations. This is especially the case with valves and taps which are never moved during the normal operation and which in the case of a conflagration have to work suddenly and automatically. The valves according to the invention are permanently in use and will therefore work in the case of an accident.

When using a controlling apparatus according to the Figs. 4 to 6 the fusible safeguarding means have to be intercalated in the cable $h$ which is connected with the weighed lever 66. With the said means the dispensing is in the case of a conflagration automatically interrupted, as after the smelting of the safeguarding means and yielding of the cable $h$ the weighed lever 66 drops into its lower position according to Fig. 6. Thereby the said lever and its roller 65 move the guide 58 downwardly, until the said guide meets the pin 69 and opens the inlet and outlet valve 11$^a$.

The cross-section of the discharge duct of the valve 11$^a$ being larger than that of the additional inlet valve 12$^a$ now opened, the upper diaphragm-chamber 2$^a$ will be released from pressure so that the spring 19$^a$ may become operative to effect shutting off of the valve 27$^a$, so that the connection of the duct $c$ with the discharge nozzle 6$^a$ is established. Through the dropping of the weighed lever 66 the plant is brought to the state of rest and of release of pressure without actuating a single member that has not permanently been used in the normal operation.

We claim:

1. In a hydraulic fuel dispensing system, a storage tank fuel dispensing means comprising a tapping valve, pressure-water feed means, a pressure member adapted on being moved to put said storage tank into communication with said feed means, valve means adapted to cause said pressure member to be moved into one of its end positions, and hydraulic means to temporarily maintain the communication established by said pressure member independently from the position of said valve means.

2. In a hydraulic fuel dispensing system, a storage tank, fuel dispensing means comprising a tapping valve, pressure-water feed means, a pressure member adapted on being moved to put said storage tank into communication with said feed means, valve means adapted to cause said pressure member to be moved into one of its end positions, hydraulic means to temporarily maintain the communication established by said pressure member independently from said valve means, and means to automatically interrupt said communication and to put said storage tank into communication with the atmosphere.

3. In a hydraulic fuel dispensing system, a storage tank, a fuel dispensing pipe having a tapping valve, a pressure chamber, a pressure-water feed pipe, a pressure water supply pipe adapted to establish communication between said chamber and said tank, a discharge passage adapted to establish communication between said chamber and the atmosphere, a pressure member adapted to be moved within said chamber, means to arbitrarily put one side of said pressure member into communication with said feed pipe so as to cause said pressure member to be moved in an end position to establish communication between said feed pipe and said supply pipe and to interrupt communication between said discharge passage and said chamber, and means to automatically maintain said pressure member in said end position, said means being under the control of the pressure conditions within said chamber.

4. In a hydraulic fuel dispensing system, a storage tank, a fuel dispensing pipe having a tapping valve, a pressure chamber, a pressure-water feed pipe, a pressure water supply pipe adapted to establish communication between said chamber and said tank, a discharge passage adapted to establish communication between said chamber and the atmosphere, a pressure member adapted to be moved within said chamber, means to arbitrarily put one side of said pressure member into communication with said feed pipe so as to cause said pressure member to be moved in an end position to establish communication between said feed pipe and said supply pipe and to interrupt communication between said discharge passage and said chamber, throttle means between said feed pipe and the other side of said pressure member, and additional means to automatically put said one side of the pressure member into communication with said feed pipe, said pressure member being under the joint control of said throttle means and said additional means.

5. In a hydraulic fuel dispensing system, a storage tank, a fuel dispensing pipe having a tapping valve, a pressure chamber, a pressure-water feed pipe, a pressure water supply pipe adapted to establish communication between said chamber and said tank, a discharge passage adapted to establish communication between said chamber and the atmosphere, a pressure member adapted to be moved within said chamber, means to arbitrarily put one side of said pressure member into communication with said feed pipe so as to cause said pressure member to be moved in an end position to establish communication between said feed pipe and said supply pipe and to interrupt communication between said discharge passage and said chamber, adjustable throttle means between said feed pipe and the other side of said pressure member, and additional means to automatically put said one side of the pressure member into communication with said feed pipe on said tapping valve being closed.

6. In a hydraulic fuel dispensing system, a storage tank, a fuel dispensing pipe having a tapping valve, a valve chamber, a spring actuated pressure member shiftable within said valve chamber and subdividing it into two compartments, a pressure water supply pipe leading from one of said compartments to said tank, an outlet conduit leading into the atmosphere and adapted to be put into communication with said one compartment by said pressure member, a third compartment, a passage between said third compartment and said one compartment, a main valve controlling said passage and adapted to be closed by said pressure member, a pressure-water feed conduit leading into said third compartment, a pressure water inlet pipe leading from said feed pipe into the other one of said two compartments, an inlet valve controlling said inlet pipe and adapted to be opened by said pressure member, a controlling valve adapted in one of its positions to establish communication between said inlet valve and said inlet pipe and in another position to establish communication between said inlet valve and the atmosphere, an additional inlet pipe leading from said feed pipe into said other compartment, and an additional inlet valve controlling said additional inlet pipe and adapted to be closed by said pressure member on the first named inlet pipe being opened by it.

7. In a hydraulic fuel dispensing system, a storage tank, a fuel dispensing pipe having a tapping valve, a valve chamber, a spring actuated pressure member shiftable within said valve chamber and subdividing it into two compartments, a pressure water supply pipe leading from one of said compartments to said tank, an outlet conduit leading into the atmosphere and adapted to be put into communication with said one compartment by said pressure member, a third compartment, a passage between said third compartment and said one compartment, a main valve controlling said passage and adapted to be closed by said pressure member, a pressure-water feed conduit having a part of restricted passage area and leading into said third compartment, a pressure-water inlet pipe leading from said feed pipe into the other one of said two compartments, an inlet valve controlling said inlet pipe and adapted to be opened by said pressure member, a controlling valve, adapted in one of its positions to establish communication between said inlet valve and said inlet pipe and in another position to establish communication between said inlet valve and the atmosphere, a drawing member to operate said controlling valve from a place near said tapping valve, an additional inlet pipe leading from said feed pipe into said other compartment, and an additional inlet valve controlling said additional inlet pipe and adapted to be closed by said pressure member on the first named inlet pipe being opened by it.

8. In a hydraulic fuel dispensing system, a storage tank, a fuel dispensing pipe having a tapping valve, a valve chamber, a spring actuated pressure member shiftable within said valve chamber and subdividing it into two compartments, a pressure water supply pipe leading from one of said compartments to said tank, an outlet conduit leading into the atmosphere and adapted to be put into communication with said one compartment by said pressure member, a third compartment, a passage between said third compartment and said one compartment, a main valve controlling said passage and adapted to be closed by said pressure member, a pressure-water feed conduit having a part of restricted passage area and leading into said third compartment, means to vary the area of said restricted part, a pressure water inlet pipe leading from said feed pipe into the other one of said two compartments, an inlet valve controlling said inlet pipe and adapted to be opened by said pressure member, a controlling valve adapted in one of its positions to establish communication between said inlet valve and said inlet pipe and in another position to establish communication between said inlet valve and the atmosphere, flexible means to operate said controlling valve from a remote place near said tapping valve, an additional inlet pipe leading from said feed pipe into said other compartment, and an additional inlet valve controlling said additional inlet pipe and adapted to be closed by said pressure member on the first named inlet pipe being opened by it.

9. In a hydraulic fuel dispensing system, a storage tank, fuel dispensing means comprising a tapping valve, pressure-water feed means, a controlling device adapted on being started to put said storage tank into communication with said feed means, means to start said controlling device, means to operate said starting means from a place near said tapping valve, means mechanically independent from said starting means to maintain said controlling device in its communication state, and means responsive to temperature rising to automatically interrupt the communication established by said controlling device and to put said storage tank into communication with the atmosphere.

10. In a hydraulic fuel dispensing system, a storage tank, fuel dispensing means comprising a tapping valve, pressure-water feed means, a controlling device adapted on being started to put said storage tank into communication with said feed means, means to start said controlling device, means to operate said starting means from a place near said tapping valve, means mechanically independent from said starting means to maintain said controlling device in its communication state, and fusible means inserted in said operating means and adapted on being released to cause the communication established by said controlling device to be interrupted and said storage tank to be put into communication with the atmosphere.

11. In a hydraulic fuel dispensing system, a storage tank, fuel dispensing means comprising a tapping valve, pressure-water feed means, a controlling device adapted on being started to put said storage tank into communication with said feed means, means to start said controlling device, a flexible member to operate said starting means from a remote place, means mechanically independent from said starting means to maintain said controlling device in its communication state, and fusible safeguarding members inserted in said flexible members and adapted on being put into operation to cause automatically shutting off said feed means.

12. In a hydraulic fuel dispensing system, a storage tank, fuel dispensing means comprising a tapping valve, a pressure-water feed pipe, a pressure-water supply pipe leading into said tank, an outlet passage, a main valve adapted to control the flow of pressure-water from said feed pipe into said tank, a pressure member adapted to actuate said main valve so as to shut off said feed pipe and put said outlet passage into communication with the atmosphere in its one position and to give passage from said feed pipe into said tank and to shut off the connection between the tank and said outlet passage in another position, controlling means adapted to cause said pressure member to move in its different positions, said controlling means comprising an inlet valve, means to operate said inlet valve, and fusible safeguarding means inserted in said operating means and adapted on being fused to cause said passage from the feed pipe into the tank to be interrupted.

13. In a hydraulic fuel dispensing system, a storage tank, fuel dispensing means comprising a tapping valve, a pressure-water feed pipe, a pressure-water supply pipe leading into said tank, an outlet passage, a main valve adapted to control the flow of pressure-water from said feed pipe into said tank, a pressure member adapted to actuate said main valve so as to shut off said feed pipe and put said outlet passage into communication with the atmosphere in its one position and to give passage from said feed pipe into said tank and to shut off the connection between the tank and said outlet passage in another position, controlling means adapted to cause said pressure member to move in its different positions, said controlling means comprising a normally closed inlet valve, and means responsive to unusual temperatures and adapted when released to automatically open said inlet valve and thereby to cause the communication from said feed pipe to said tank to be interrupted.

14. In a hydraulic fuel dispensing system, a storage tank, fuel dispensing means comprising a tapping valve, a pressure-water feed pipe, a pressure, water supply pipe leading into said tank, an outlet passage, a main valve adapted to control the flow of pressure-water from said feed pipe into said tank, a pressure member adapted to actuate said main valve so as to shut off said feed pipe and put said outlet passage into communication in its one position and to give passage from said feed pipe into said tank and to shut off the connection between the tank and said outlet passage in another position, controlling means adapted to cause said pressure member to move in its different positions, said controlling means comprising an inlet valve normally closed, means responsive to abnormal temperatures and adapted when released to automatically open said inlet valve and thereby to cause the communication from said feed pipe to said tank to be interrupted, a controlling valve adapted in one of its positions to establish communication between said inlet valve and said inlet pipe and in another position to establish communication between said inlet valve and the atmosphere, a drawing member to operate said controlling valve from a place near said tapping valve, and fusible means inserted in said drawing member and adapted on being released to cause the communication established by said controlling device to be interrupted and said storage tank to be put into communication with the atmosphere.

15. In a hydraulic fuel dispensing system, a storage tank, a pressure-water supply, a fuel dispensing pipe comprising a tapping valve, movable controlling means adapted when moved into one position to put said tank into communication with said pressure-water supply and to interrupt said communication and to put said tank into communication with the atmosphere when moved into another position, starting means adapted when operated to initiate movement of said controlling means into said first named position, and safeguard means responsive to unusual temperature rising adapted when released to automatically cause movement of said controlling means into the other position.

16. In a hydraulic fuel dispensing system, a storage tank, a pressure-water supply, a fuel dispensing pipe comprising a tapping valve, movable controlling means adapted when moved into one position to put said tank into communication with said pressure-water supply and to interrupt said communication and to put said tank into communication with the atmosphere when moved into another position, hydraulic means to move said controlling means into said first named position, a normally closed inlet valve controlling said hydraulic means, a controlling valve adapted in one of its positions to establish communication between said inlet valve and said pressure water supply and in another position to establish communication between said inlet valve and the atmosphere, a drawing member adapted to operate said controlling valve, and fusible means inserted in said drawing member and adapted on melting said drawing member to release.

17. In a hydraulic fuel dispensing system, a storage tank, a pressure-water supply, a fuel dispensing pipe comprising a tapping valve, movable controlling means adapted when moved into one position to put said tank into communication with said pressure-water supply and to interrupt said communication and to put said tank into communication with the atmosphere when moved into another position, hydraulic means to move said controlling means into said first named position, a normally closed inlet valve controlling said hydraulic means, a controlling valve adapted in one of its positions to establish communication between said inlet valve and said pressure water supply and in another position to establish communication between said inlet valve and the atmosphere, a drawing member adapted to operate said controlling valve, fusible means inserted in said drawing member and adapted on melting said drawing member to release, normally locked means to automatically open said inlet valve, and means to release said opening means in the case of a conflagration.

18. In a hydraulic fuel dispensing system, a storage tank, a pressure-water supply, a fuel dispensing pipe comprising a tapping valve, movable controlling means adapted when moved into one position to put said tank into communication with said pressure-water supply and to interrupt said communication and to put said tank into communication with the atmosphere when moved into another position, hydraulic means to move said controlling means into said first named position, a normally closed inlet valve controlling said hydraulic means, a controlling valve adapted in one of its positions to establish communication between said inlet valve and said pressure water supply and in another position to establish communication between said inlet valve and the atmosphere, a drawing member adapted to operate said controlling valve, fusible means inserted in said drawing member and adapted on melting said drawing member to release, normally locked means to automatically open said inlet valve, means to release said opening means in the case of a conflagration, said releasing means comprising a drawing member operatively connected to said operating means, and fusible means inserted in said drawing member.

19. In a hydraulically operated fuel tapping plant the combination with a storage tank, of a fuel dispensing pipe, a tapping valve, a pressure-water feed pipe, a pressure-water supply pipe leading into said tank, a controlling device inserted between said feed pipe and said supply pipe and adapted on being started to communicate said feed pipe with said supply pipe, manually movable mechanical means to start said controlling device and means to automatically maintain said controlling device in its communicating position as long as said tapping valve is in its open position.

20. In a hydraulic fuel dispensing system, a storage tank, fuel dispensing means comprising a tapping valve, pressure water feed means, a valve mechanism for controlling the communication between said pressure water feed means and said storage tank, means to start said valve mechanism and hydraulic means to maintain said valve mechanism in its communication state independently from said starting means.

21. In a hydraulic fuel dispensing system, a storage tank, fuel dispensing means comprising a tapping valve, pressure water feed means, a valve mechanism for controlling the communication between said pressure water feed means and said storage tank, means to start said valve mechanism, said starting means being adapted to be operated from a place near said tapping valve but independently therefrom, and hydraulic means to maintain said valve mechanism in its communication state independently from said starting means.

22. In a hydraulic fuel dispensing system, a storage tank, fuel dispensing means comprising a tapping valve, pressure water feed means, a valve mechanism for controlling the communication between said pressure water feed means and said storage tank, means to start said valve mechanism, and hydraulic means to automatically maintain the communication established by said valve mechanism as long as said tapping valve is opened.

23. In a hydraulic fuel dispensing system, a storage tank, fuel dispensing means comprising a tapping valve, pressure water feed means, a valve mechanism adapted on being started to put said storage tank into communication with said feed means, means to start said valve mechanism, hydraulic means to maintain said valve mechanism in its communication state independently from said starting means, and means to automatically interrupt the communication established and to put said storage tank into communication with the atmosphere, said means being other than and independent from said starting means.

24. In a hydraulic fuel dispensing system, a storage tank, fuel dispensing means comprising a tapping valve, pressure water feed means, a valve mechanism adapted on being started to put said storage tank into communication with said feed means, means to start said valve mechanism, hydraulic means to automatically maintain the communication established by said valve mechanism as long as said tapping valve is opened, and means associated with said valve mechanism to automatically interrupt said communication upon closing of said tapping valve.

25. In a hydraulically operated fuel tapping plant the combination with a storage tank, a fuel dispensing pipe, a tapping valve, a pressure water feed pipe, a pressure water supply pipe leading into said tank, a valve mechanism inserted between said feed pipe and said supply pipe and adapted on being started to communicate said feed pipe with said supply pipe, and movable mechanical means to automatically maintain said valve mechanism in its communicating position said means depending upon the open position of said tapping valve.

26. In a fuel dispensing system, a storage tank having fuel dispensing means associated thereto, pressure water feed means for said fuel, a valve mechanism for controlling the communication between said pressure water feed means and said storage tank, means to effect shifting of said valve mechanism into communicating position by said pressure water, and means to maintain said valve mechanism in communicating position under the control of water within said system having reduced pressure with respect to the pressure effecting shifting of said valve mechanism into communicating position.

27. In a fuel dispensing plant, a storage tank having fuel dispensing means associated thereto, a pressure water feed system for said fuel, a valve mechanism for controlling the communication between said pressure water feed system and said storage tank, said valve mechanism having means associated thereto to cause a reduced pressure of the flowing water within a predetermined section of said pressure water feed system, said reduced pressure and the normal pressure in another predetermined section of said valve mechanism holding said mechanism automatically in feeding position after feeding action has been initiated.

28. In a fuel dispensing system, a storage tank, fuel dispensing means having a tapping valve associated thereto, pressure water feed means for said fuel, a device for controlling the action of said feed means upon said fuel, means coacting with said controlling device for initiating feed action, means to maintain said controlling device after initiation in feeding position, and means to automatically interrupt the communication established by said controlling device said means being responsive to an increase of pressure within one and the same section of said pressure water feed system when fuel dispensing is being stopped.

29. In a hydraulic fuel dispensing system, a storage tank, fuel dispensing means having a tapping valve associated thereto, pressure water feed means for said fuel, a device for controlling pressure of said water upon the fuel, manually movable means coacting with said device to initiate pressure upon said fuel for dispensing the same, means to maintain said controlling device after initiation in feeding position to maintain pressure upon the fuel, and means associated with said controlling device to automatically interrupt feeding action when said tapping valve is being closed said means being controlled by the change of pressure within said pressure water feed system caused by the closure of said tapping valve.

30. In a fuel dispensing system, a storage tank having fuel dispensing means associated thereto, pressure water feed means for said fuel, a device for controlling the action of said pressure water upon said fuel, means to start said controlling device for feeding action, means to automatically maintain said device in feeding position, and means to automatically disable said maintaining means by the stop of the flow of pressure water caused by closing of said fuel dispensing means.

31. In a hydraulic fuel dispensing system, a storage tank, fuel dispensing means including a tapping valve, pressure water feed means for said fuel, a device for controlling pressure of said water upon the fuel, yieldingly mounted manual means coacting with said device to momentarily initiate pressure upon said fuel for dispensing the same, and means to maintain said controlling device automatically in active position after said momentary actuation of said manual means.

32. In a hydraulic fuel dispensing system, a storage tank having fuel dispensing means associated thereto, said means including a tapping valve, pressure water feed means, a device for controlling the action of said pressure water feed means upon the fuel within said tank, means coacting with said device to momentarily initiate pressure upon said fuel for dispensing the same, and a mechanism to restore said means after initiation, and means to maintain said controlling device after initiation in active position to maintain pressure upon the fuel.

33. In a hydraulic fuel dispensing system, a storage tank having fuel dispensing means associated thereto, said means including a tapping valve, pressure water feed means, a device for controlling the action of said pressure water feed means upon the fuel within said tank, means coacting with said device to momentarily initiate pressure upon said fuel for dispensing the same and a mechanism to restore said means immediately after initiation, means to maintain said controlling device after initiation in active position to maintain pressure upon said fuel, and means associated with said controlling device to automatically interrupt pressure upon said fuel when said tapping valve is being closed.

34. In a hydraulic fuel dispensing system, a storage tank having fuel dispensing means associated thereto, pressure water feed means, a device for controlling the communication between said storage tank and said pressure water feed means, means independent from said fuel dispensing means for momentarily establishing said communication through said controlling device, means to maintain said communication while said communication establishing means are in home position, and means associated with said controlling device said means being responsive to the flow of pressure water to automatically interrupt said communication when said fuel dispensing means are being closed.

35. In a hydraulic fuel dispensing system, a storage tank, fuel dispensing means comprising a tapping valve, pressure water feed means, a valve mechanism for controlling the communication between said pressure water feed means and said storage tank, means for starting said valve mechanism, means for operating said starting means, hydraulic means for maintaining said valve mechanism in its state of communication independently from said starting means and means responsive to an increase of temperature, said means being associated with said operating means, for automatically interrupting the communication established by said valve mechanism and for effecting communication between said storage tank and the atmosphere.

36. In a hydraulic fuel dispensing system, a storage tank, fuel dispensing means comprising a tapping valve, pressure water feed means, a valve mechanism for controlling the communication between said pressure water feed means and said storage tank, means for starting said valve mechanism, means for operating said starting means, hydraulic means for maintaining said valve mechanism in its state of communication independently from said starting means, a flexible member adapted to operate said starting means, and fusible safeguarding means inserted into said flexible member for automatically interrupting the communication established by said valve mechanism and for putting said storage tank into communication with the atmosphere.

37. In a hydraulic fuel dispensing system, a storage tank, fuel dispensing means comprising a tapping valve, pressure water feed means, a valve mechanism for controlling the communication between said pressure water feed means and said storage tank, means for starting said valve mechanism, said starting means being adapted to be operated from a place near said tapping valve but independently therefrom, hydraulic means for maintaining said valve mechanism in its state of communication independently from said starting means, and fusible means inserted into said starting means and adapted on being released due to unusual temperature to cause the interruption of the communication which had been established by said controlling valve mechanism.

38. In a hydraulic fuel dispensing system, a storage tank, fuel dispensing means comprising a tapping valve, pressure water feed means, a valve mechanism adapted to put said storage tank into communication with said feed means, means for starting said valve mechanism, hydraulic means for automatically maintaining the communication established by said valve mechanism as long as said tapping valve is opened, means associated with said valve mechanism for automatically engaging said valve mechanism automatically to interrupt said communication upon closing of said tapping valve, and safeguarding means responsive to an increase of temperature, such means being inserted into said starting means for automatically interrupting the communication which had been established by said valve mechanism and for putting said storage tank into communication with the atmosphere.

39. In a hydraulic fuel dispensing system, a storage tank, fuel dispensing means including a tapping valve, means for feeding pressure water, a device for controlling the pressure of said water upon the fuel, yieldingly mounted and manually operable means coacting with said device momentarily to initiate pressure action upon said fuel for dispensing the same, means for automatically maintaining said controlling device in active position after said momentary actuation of said manually operable means, and fusible safeguarding means inserted into said yieldingly mounted and manually operable means so as to disable them on being fused.

40. In a hydraulic fuel dispensing system, a storage tank having fuel dispensing means associated thereto, a tapping valve, pressure water feed means, a device for controlling the communication between said storage tank and said feed means, means for starting said controlling device, a flexible member for operating said starting means from a remote place, means for maintaining said controlling device in its state of communication, said maintaining means being mechanically independent from said starting means, and fusible safeguarding members inserted into said flexible member and adapted on being released under unusual temperature automatically to cause shutting off of said feed means.

41. In a hydraulic fuel dispensing system, a storage tank, fuel dispensing means comprising a tapping valve, a pressure water feed pipe, a pressure water supply pipe, an outlet passage, a main valve adapted to control the flow of pressure water from said feed pipe into said tank, a pressure member adapted to actuate said main valve, controlling means adapted to cause said pressure member to move into its different positions, said controlling means comprising an inlet valve normally closed, means responsive to unusual temperature and adapted, when released, automatically to open said inlet valve and thereby to cause the interruption of the communication between said feed pipe and said tank, a controlling valve adapted to establish in one of its positions communication between said inlet valve and said inlet pipe and in another of its positions communication between said inlet valve and the atmosphere, a drawing member for operating said controlling valve from a place near said tapping valve, and fusible means being inserted into said drawing member and, when released, adapted to cause the interruption of the communication established by said controlling device and the communication of said storage tank with the atmosphere.

42. In a hydraulic fuel dispensing system, a storage tank, a pressure water supply, a fuel dispensing pipe comprising a tapping valve, movable controlling means adapted, when moved into one position, to put said tank into communication with said pressure water supply and, when moved into another position, to interrupt said communication and to put said tank into communication with the atmosphere, hydraulic means to move said controlling means into said first named position, a normally closed inlet valve controlling said hydraulic means, a controlling valve adapted in one of its positions to establish communication between said inlet valve and said pressure water supply and in another of its positions to establish communication between said inlet valve and the atmosphere, a drawing member adapted to operate said controlling valve, fusible means inserted into said drawing member and adapted, when melting, to release said drawing member, normally locked means for automatically opening said inlet valve, and in association with said normally locked means fusible means for releasing the normally locked means in the case of a conflagration.

43. In a hydraulic fuel dispensing system, a storage tank, a pressure water supply, a fuel dispensing pipe comprising a tapping valve, movable controlling means adapted, when moved into one position, to put said tank into communication with said pressure water supply, and when moved into another position, to interrupt said communication and to put said tank into communication with the atmosphere, means for manually operating said controlling means, hydraulic means for moving said controlling means into said first named position, a normally closed inlet valve controlling said hydraulic means, a controlling valve adapted in one of its positions to establish communication between said inlet valve and said pressure water supply and in another of its positions to establish communication between said inlet valve and the atmosphere, a drawing member adapted to operate said controlling valve, fusible means being inserted into said drawing member and, when melting, adapted to release said drawing member, normally locked means for automatically opening said inlet valve, means for releasing said normally locked opening means in the case of a conflagration, said releasing means comprising a tensile member operatively connected with said operating drawing member, and fusible means inserted into said tensile member.

In testimony whereof we affix our signatures.

ERNST HURLBRINK.
MAX LUDWIG.